US012536206B2

(12) United States Patent
Balasubramanian et al.

(10) Patent No.: US 12,536,206 B2
(45) Date of Patent: Jan. 27, 2026

(54) INFERRING GRAPH MODEL FROM DATA IN LAKE

(71) Applicant: Microsoft Technology Licensing, LLC, Redmond, WA (US)

(72) Inventors: Santosh Balasubramanian, Seattle, WA (US); Yuanyuan Tian, San Jose, CA (US); Juan Andres Colmenares Diaz, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/658,800

(22) Filed: May 8, 2024

(65) Prior Publication Data

US 2025/0348515 A1    Nov. 13, 2025

(51) Int. Cl.
*G06F 16/28* (2019.01)
*G06F 16/22* (2019.01)
*G06F 16/2455* (2019.01)

(52) U.S. Cl.
CPC .......... *G06F 16/288* (2019.01); *G06F 16/221* (2019.01); *G06F 16/2456* (2019.01)

(58) Field of Classification Search
CPC ................................................... G06F 16/288
USPC ......................................................... 707/803
See application file for complete search history.

(56) References Cited

U.S. PATENT DOCUMENTS

| 9,280,581 B1 | 3/2016 | Grimes |
| 10,628,421 B2 | 4/2020 | Devarao |
| 10,901,973 B1 | 1/2021 | Senra et al. |
| 11,216,455 B2 | 1/2022 | Tong |
| 11,656,868 B1 | 5/2023 | Gottlob et al. |
| 2004/0204838 A1 | 10/2004 | Chen et al. |
| 2008/0168071 A1 | 7/2008 | Dykes et al. |
| 2010/0031162 A1 | 2/2010 | Wiser et al. |

(Continued)

FOREIGN PATENT DOCUMENTS

| WO | 2009149262 A1 | 12/2009 |
| WO | 2019149262 A1 | 8/2019 |
| WO | WO-2024157776 A1 * | 8/2024 |

OTHER PUBLICATIONS

Non-Final Office Action mailed on Feb. 7, 2025, in U.S. Appl. No. 18/658,751, 33 Pages.

(Continued)

*Primary Examiner* — Syling Yen
(74) *Attorney, Agent, or Firm* — ArentFox Schiff LLP (57) ABSTRACT

Apparatuses, methods, and computer-readable media infer a graph model from data. The apparatus detects joinable columns within a plurality of columns of source tables in a data lake, the joinable columns defining a plurality of relationships between columns and including columns with an m:m relationship. The apparatus extracts, from the joinable columns, a virtual vertex table represented by a union of corresponding columns that breaks the m:m relationship into two m:1 relationships. The apparatus identifies at least one primary key for each relationship of the plurality of relationships, each relationship defining at least one from-table and one to-table. The apparatus creates a vertex table in the graph model for each source table or virtual vertex table having a primary key. The apparatus creates an edge table in the graph model for each from-table defined in the plurality of relationships.

20 Claims, 7 Drawing Sheets

(56) References Cited

U.S. PATENT DOCUMENTS

| | | |
|---|---|---|
| 2010/0031165 A1 | 2/2010 | Lindquist |
| 2016/0071233 A1 | 3/2016 | Macko et al. |
| 2016/0342708 A1 | 11/2016 | Fokoue-Nkoutche |
| 2017/0068748 A1 | 3/2017 | Hu et al. |
| 2017/0193016 A1 | 7/2017 | Kulkarni |
| 2017/0364534 A1 | 12/2017 | Zhang |
| 2018/0011945 A1 | 1/2018 | Vaquero Gonzalez |
| 2018/0039710 A1 | 2/2018 | Chen et al. |
| 2018/0225314 A1 | 8/2018 | Devarao |
| 2019/0121810 A1 | 4/2019 | Zhuang |
| 2019/0171655 A1* | 6/2019 | Psota ............... G06Q 10/083 |
| 2020/0201909 A1 | 6/2020 | Das et al. |
| 2021/0056104 A1 | 2/2021 | Tong et al. |
| 2021/0256053 A1 | 8/2021 | Soppin et al. |
| 2021/0256063 A1 | 8/2021 | Kasperovics et al. |
| 2022/0138262 A1 | 5/2022 | Yan et al. |
| 2022/0245147 A1* | 8/2022 | Segalini ............ G06F 16/24552 |
| 2023/0175856 A1 | 6/2023 | Khoe |
| 2023/0176856 A1 | 6/2023 | Khare et al. |
| 2023/0267120 A1 | 8/2023 | Hugo |

OTHER PUBLICATIONS

Non-Final Office Action mailed on Feb. 27, 2025, in U.S. Appl. No. 18/679,250, 17 Pages.

Non-Final Office Action mailed on May 20, 2025, in U.S. Appl. No. 18/744,242, 12 pages.

Extended European Search Report received in European Application No. 25176679.6, mailed on Jul. 30, 2025, 12 pages.

Final Office Action mailed on Aug. 11, 2025, in U.S. Appl. No. 18/679,250, 19 pages.

Final Office Action mailed on Jul. 15, 2025, in U.S. Appl. No. 18/658,751, 11 pages.

Extended European search report received for European Application No. 25174447.0, mailed on Aug. 18, 2025, 9 Pages.

Koutras, et al., "OmniMatch: Effective Self-Supervised Any-Join Discovery in Tabular Data Repositories", Retrieved from: https://arxiv.org/abs/2403.07653, Mar. 12, 2024, 14 Pages.

* cited by examiner

INFERRING GRAPH MODEL FROM DATA IN LAKE

BACKGROUND

Graph models offer a powerful tool for data analysis by allowing queries that explore the relationships among data elements. Conventional approaches to using graph models involve constructing a graph database by performing extract, transform, and load (ETL) processes to make a copy of the source data. Such processes are resource intensive in terms of both computing resources to store the copied source data and human resources for designing the graph database. Further, ETL processes result in multiple copies of the data that need to be managed for accuracy, privacy, and security.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus for inferring a graph model from data, including: one or more memories; and one or more processors coupled with the one or more memories and, individually or in combination, configured to: detect joinable columns within a plurality of columns of source tables in a data lake, the joinable columns defining a plurality of relationships between columns and including columns with an m:m relationship; extract, from the joinable columns, a virtual vertex table represented by a union of corresponding columns that breaks the m:m relationship into two m:1 relationships; identify at least one primary key for each relationship of the plurality of relationships, each relationship defining at least one from-table and one to-table; create a vertex table in the graph model for each source table or virtual vertex table having a primary key, each vertex of the vertex table labeled with a name of a respective source table or a respective virtual vertex table; create an edge table in the graph model for each from-table defined in the plurality of relationships, wherein each edge of the edge table is labeled with a combination of a source vertex table, a destination vertex table, and a foreign-key column name that relates the source vertex table and the destination vertex table.

In some aspects, the techniques described herein relate to a method of inferring a graph model from data, including: detecting joinable columns within a plurality of columns of source tables in a data lake, the joinable columns defining a plurality of relationships between columns and including columns with an m:m relationship; extracting, from the joinable columns, a virtual vertex table represented by a union of corresponding columns that breaks the mm relationship into two m:1 relationships; identifying at least one primary key for each relationship of the plurality of relationships, each relationship defining at least one from-table and one to-table; creating a vertex table in the graph model for each source table or virtual vertex table having a primary key, each vertex of the vertex table labeled with a name of a respective source table or a respective virtual vertex table; creating an edge table in the graph model for each from-table defined in the plurality of relationships, wherein each edge of the edge table is labeled with a combination of a source vertex table, a destination vertex table, and a foreign-key column name that relates the source vertex table and the destination vertex table.

In some aspects, the techniques described herein relate to a non-transitory computer-readable medium having computer-executable instructions stored thereon for inferring a graph model from data, the instructions when executed by a computer processor cause the computer processor to: detect joinable columns within a plurality of columns of source tables in a data lake, the joinable columns defining a plurality of relationships between columns and including columns with an m:m relationship; extract, from the joinable columns, a virtual vertex table represented by a union of corresponding columns that breaks the m:m relationship into two m:1 relationships; identify at least one primary key for each relationship of the plurality of relationships, each relationship defining at least one from-table and one to-table; create a vertex table in the graph model for each source table or virtual vertex table having a primary key, each vertex of the vertex table labeled with a name of a respective source table or a respective virtual vertex table; create an edge table in the graph model for each from-table defined in the plurality of relationships, wherein each edge of the edge table is labeled with a combination of a source vertex table, a destination vertex table, and a foreign-key column name that relates the source vertex table and the destination vertex table.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

In an aspect, the graph model is built over existing data in a data lake. The graph model describes relationships among underlying source tables and includes pointers to locations of the data in the data lake, but does not require copying all data from the underlying source tables into a separate graph database. In an example, the graph model may be a property graph model, which is a directed graph where each vertex and each edge can have an arbitrary number of properties. Vertices may also be referred to as nodes and edges may be referred to as relationships. Vertices and edges in a property graph model are also tagged with labels to distinguish the different types of nodes and relationships in the graph. For instance, a node type in the graph model may represent a type of business entity that corresponds to a source table. Rows within the source table become node instances when the source table is mapped to the graph model.

This disclosure describes various examples related to generation of graph models based on underlying data stored in a data lake. In particular, the techniques described herein infer a graph model based on detected relationships among columns of source tables. The relationships may be detected based on similarity of the similarity of column name, column type, or overlapping data using a machine-learning model. In some implementations, the relationships may be detected without a predefined structure such as a relational database or semantic model. Accordingly, the techniques disclosed herein may be useful for generating graph models to analyze and explore unstructured or diverse data sets.

The detection of relationships using machine-learning models may detect complex many-to-many (m:m) relationships that may be difficult to represent in a graph model. These m:m relationships may occur due to entity types that are not represented as a separate table in the source tables. To facilitate creation of a graph model, the disclosed techniques include extraction of a virtual table that can represent such an entity. The complex m:m relationships can then be simplified to m:1 relationships with the virtual table. Further, when detection of relationships results in multiple equivalent relationships, a virtual table may be used to represent multiple equivalent relationships.

Inferring a graph model from the detected relationships may include mapping the vertex set and the edge set of the property graph to the tables in the data sources and the virtual tables. After extracting the virtual tables, the detected relationships can either be a 1:1 relationship or a m:1 relationship that defines a from-table and from-column, as well as the to-table and to-column, which means the from-column of the from-table references the to-column of the to-table. In an aspect, the vertex tables and edge tables of the graph model may be selected based on primary keys identified according to the type of relationship. Source tables with a primary key can be represented as a vertex table labeled with the primary key as the unique identifier. Each column in the vertex table, except the ones that are primary keys or foreign keys, is a property of the corresponding vertex. Edge tables can be created for source tables or virtual tables in a relationship with a vertex table. All edges in an edge table are labeled with the source and destination vertex table names and the foreign-key column name that relates them.

Implementations of the present disclosure may realize one or more of the following technical effects. The creation of a graph model automatically based on data tables in a data lake improves the speed of creation of graph models and allows graph models to be quickly deployed to answer questions. For example, a graph model may allow exploration of data from different sources without a need for extensive human engineering to define a relationship schema among the data. Further, the graph model can be generated on-the-fly and only when needed, which reduces storage resources compared to importing data into a graph database. Additionally, the graph model is built over underlying data in the data lake without ETL. This structure provides the functionality and performance of graph queries and algorithms without the cost of resources for copying and storing copied data. This structure also reduces the burden of data management of multiple copies of data.

Figure 4:
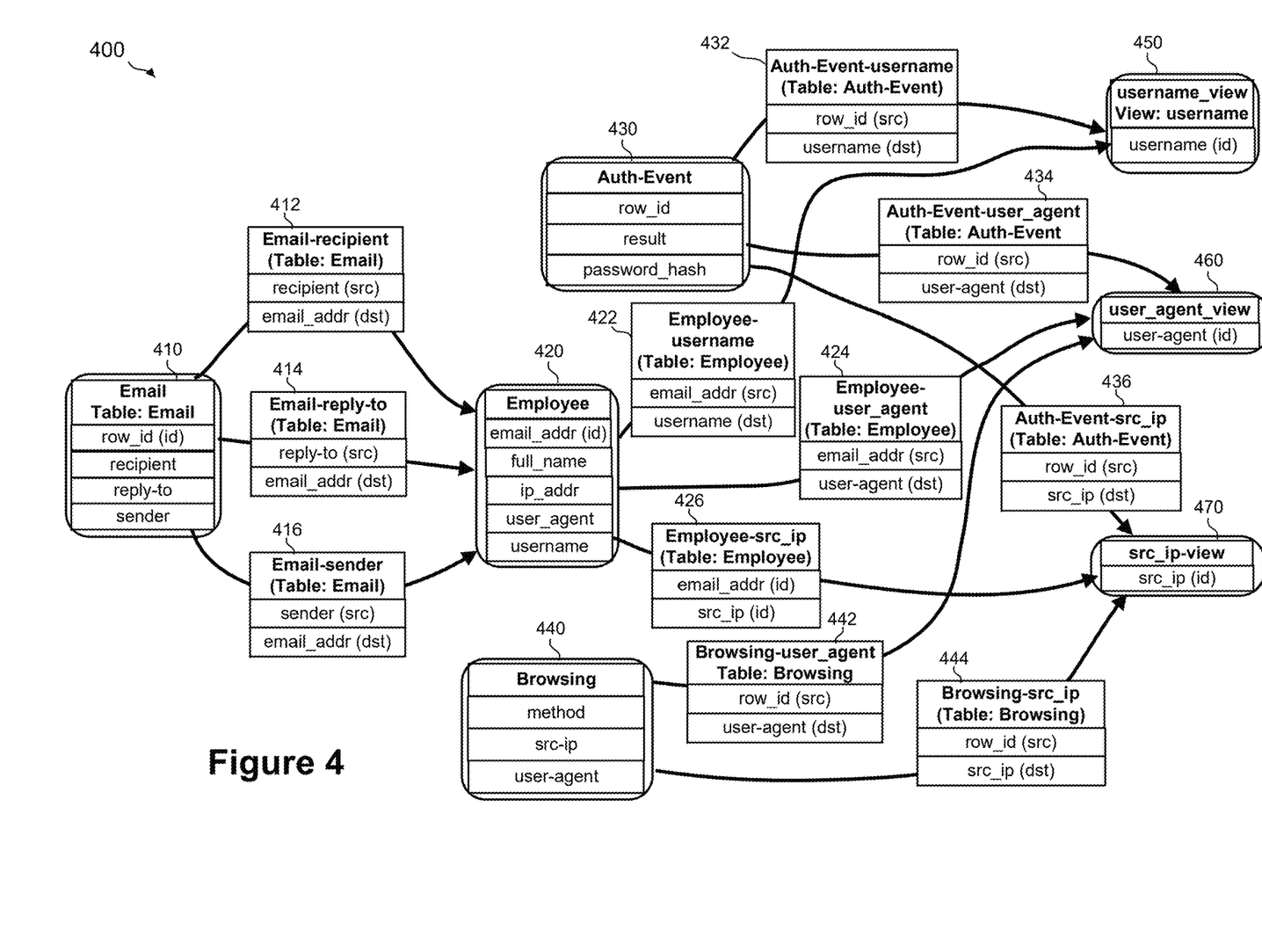
FIG. 4 is a diagram of an example graph model corresponding to the example tables and relationships of FIG. 3, in accordance with aspects described herein.
Figure 5:
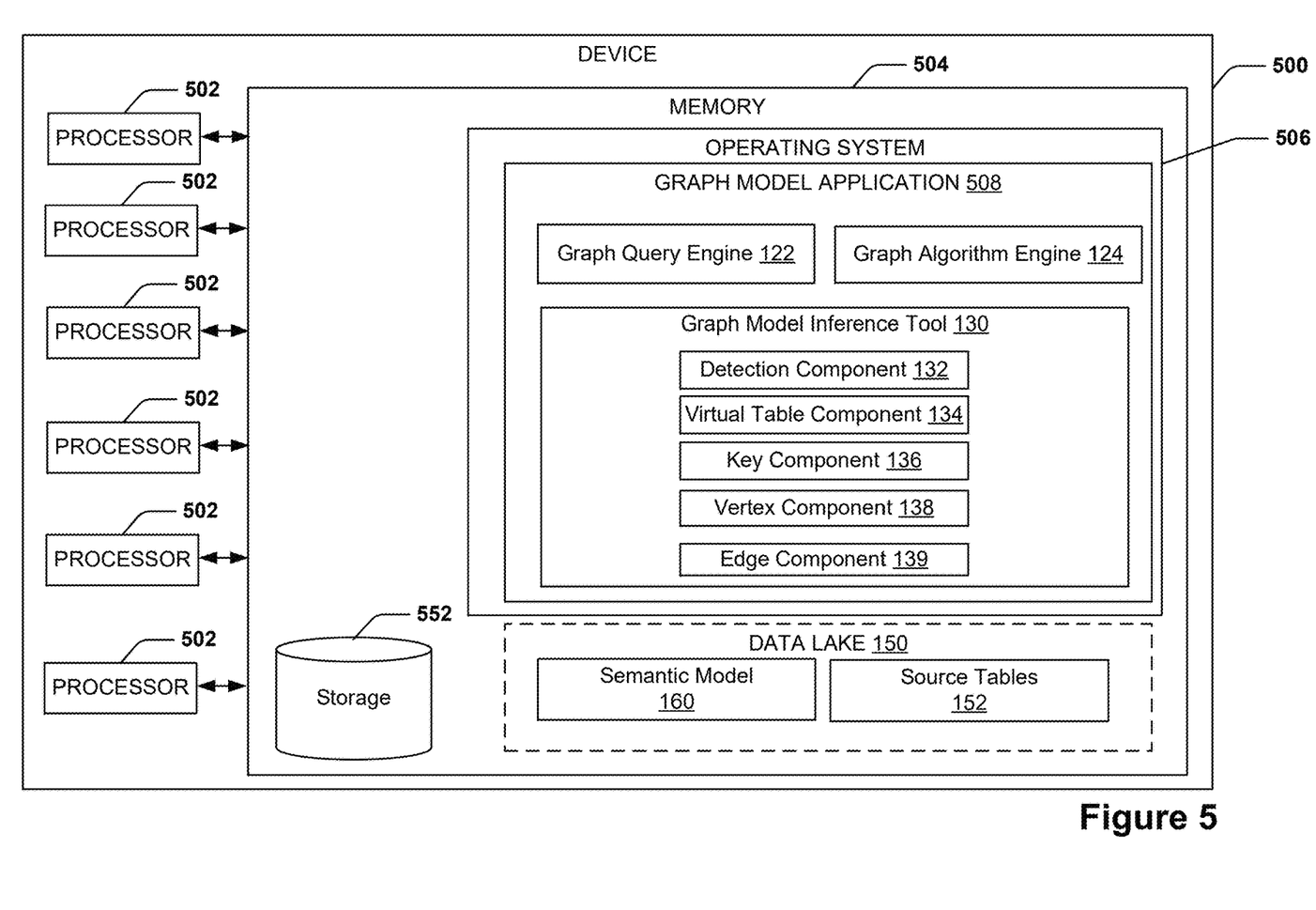
FIG. 5 is a schematic diagram of an example of an apparatus (e.g., a computing device) for inferring a graph model from source tables in a data lake.
Figure 6:
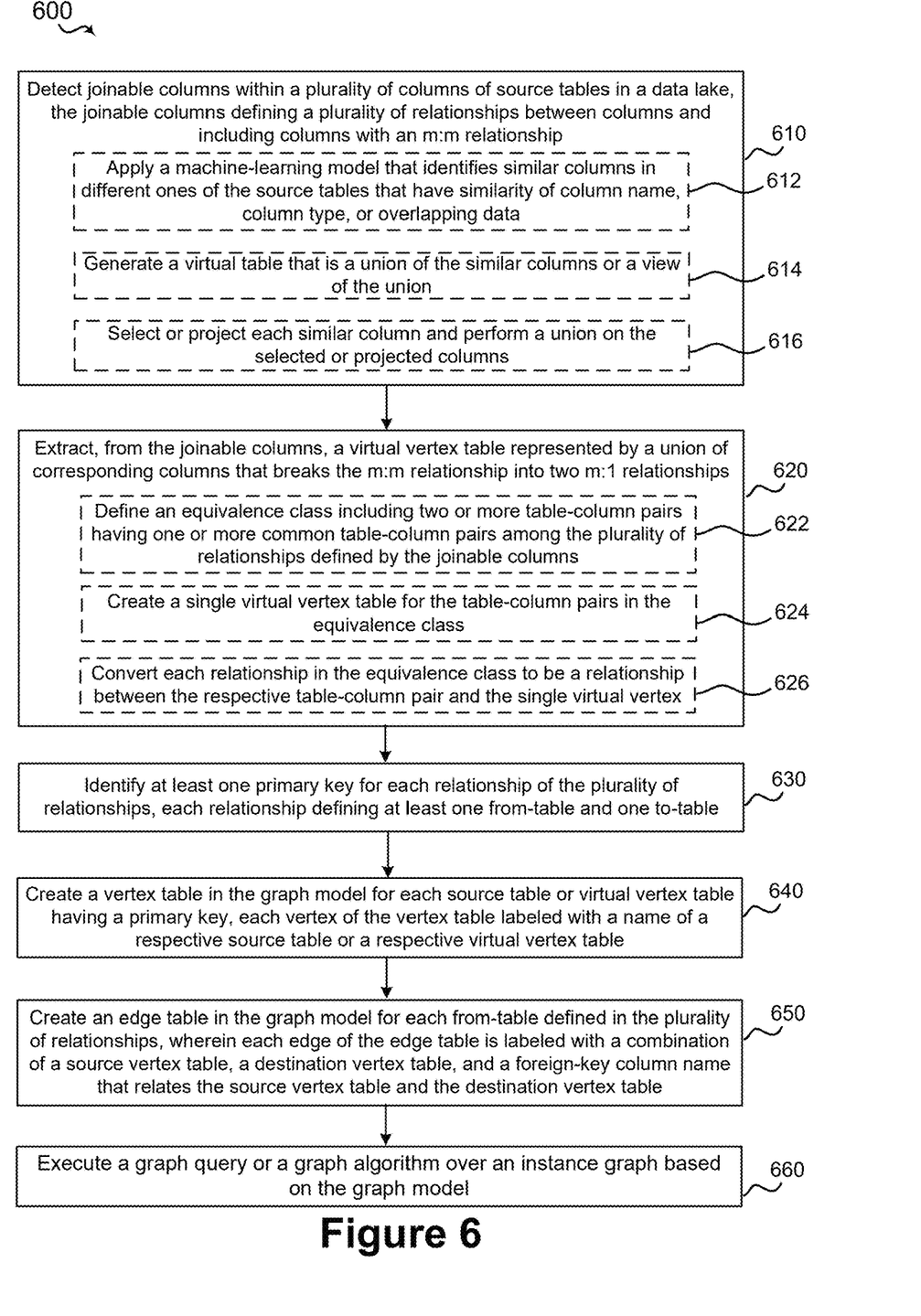
FIG. 6 is a flow diagram of an example of a method for inferring a graph model from source tables in a data lake.

Turning now to FIGS. 1-7, examples are depicted with reference to one or more components and one or more methods that may perform the actions or operations described herein, where components and/or actions/operations in dashed line may be optional. Although the operations described below in FIG. 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
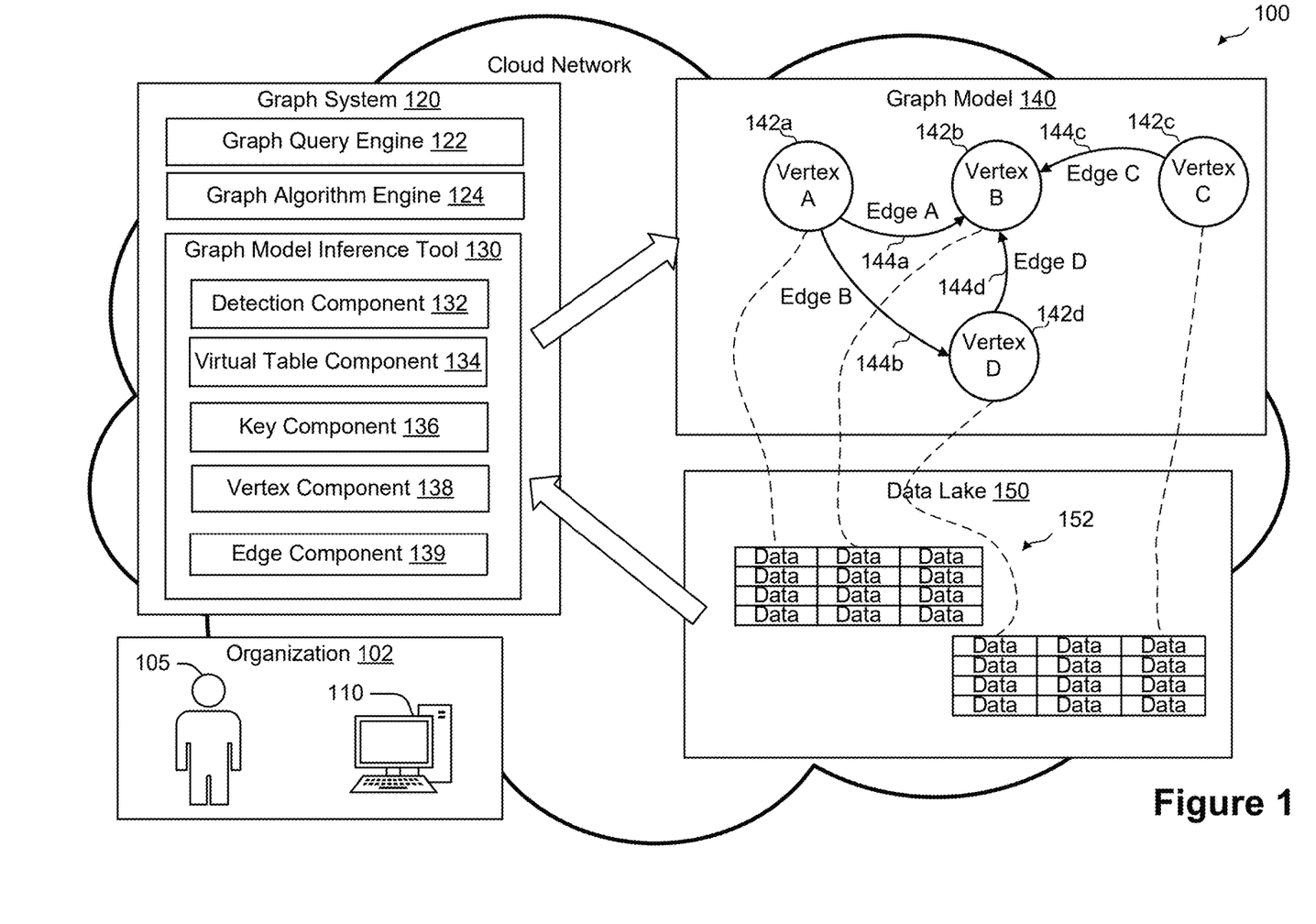
FIG. 1 is a conceptual diagram of an example of an architecture for a graph system to automatically infer a graph model based on source tables in a data lake, in accordance with aspects described herein.

FIG. 1 is a conceptual diagram 100 of an example of an architecture for a graph system 120 to automatically infer a graph model 140 based on source tables 152 in a data lake 150. The graph system 120 may be, for example, a cloud network including computing resources that are controlled by a network operator and provide services accessible to public clients such as an organization 102 represented by a user device 110 operated by a user 105. For example, the system 120 may include a plurality of datacenters that include computing resources such as computer memory and processors. In some implementations, the datacenters host a data management service that provides computing nodes and storage on computing resources located in the datacenter. The computing nodes may be containerized execution environments with allocated computing resources. For example, the computing nodes may be virtual machines (VMs), process-isolated containers, or kernel-isolated containers. The nodes may be instantiated at a datacenter and imaged with software (e.g., operating system and applications for a service). The system 120 may include edge routers that connect the datacenters to external networks such as internet service providers (ISPs) or other autonomous systems (ASes) that form the Internet.

The graph system 120 includes a data lake 150 that stores a plurality of source tables 152. The source tables 152 may include various updatable column-oriented table formats for storing tabular data such as SQL or noSQL databases, comma separated value (CSV) files, and Parquet based formats such as delta tables. For example, the source tables 152 may include data that is imported or created by the organization 102. For instance, the source tables 152 may include, for example, operational data for a business, scientific records, medical records, government records, or any other collection of data.

The graph system 120 includes a graph model inference tool 130 configured to generate a graph model 140 over the source tables 152 in the data lake 150 based on detected relationships among the source tables 152. The graph system 120 may include a detection component 132, a virtual table component 134, a key component 136, a vertex component 138, and an edge component 139. The detection component 132 is configured to detect joinable columns within a plurality of columns of source tables in a data lake, the joinable columns defining a plurality of relationships between columns and including columns with an m:m relationship. The virtual table component 134 is configured to extract, from the joinable columns, a virtual vertex table that breaks each m:m relationship into two m:1 relationships represented by a union of corresponding columns. The key component 136 is configured to identify at least one primary key for each relationship of a plurality of relationships defined in the semantic model based on whether the relationship is a m:1 relationship or a 1:1 relationship. Each relationship defines at least one from-table and one to-table. The vertex component 138 is configured to create a vertex table in the graph model for each source table having a primary key. Each vertex of the vertex table is labeled with a name of a respective source table or a respective virtual vertex table. The edge component 136 is configured to create an edge table in the graph model for each from-table defined in the plurality of relationships. Each edge of the edge table is labeled with a combination of a source vertex table, a destination vertex table, and a foreign-key column name that relates the source vertex table and the destination vertex table.

In some implementations, the graph system 120 includes a graph query engine 122 and/or a graph algorithm engine 124. The graph model 140 describes a property graph for the source tables 152. The graph query engine 122 and/or a graph algorithm engine 124 can operate on a graph index over the source tables 152 based on the graph model 140. The index references the vertex tables and edge tables using numerical identifiers. Accordingly, data may remain in the source tables 152 without ETL into a separate graph database. The graph query engine 122 can perform graph queries on the graph index, then the query results can be looked up based on the index if needed. Similarly, the graph algorithm engine 124 can perform graph algorithms on the index. Updates to data can be pushed from the index back to the source tables.

Figure 2:
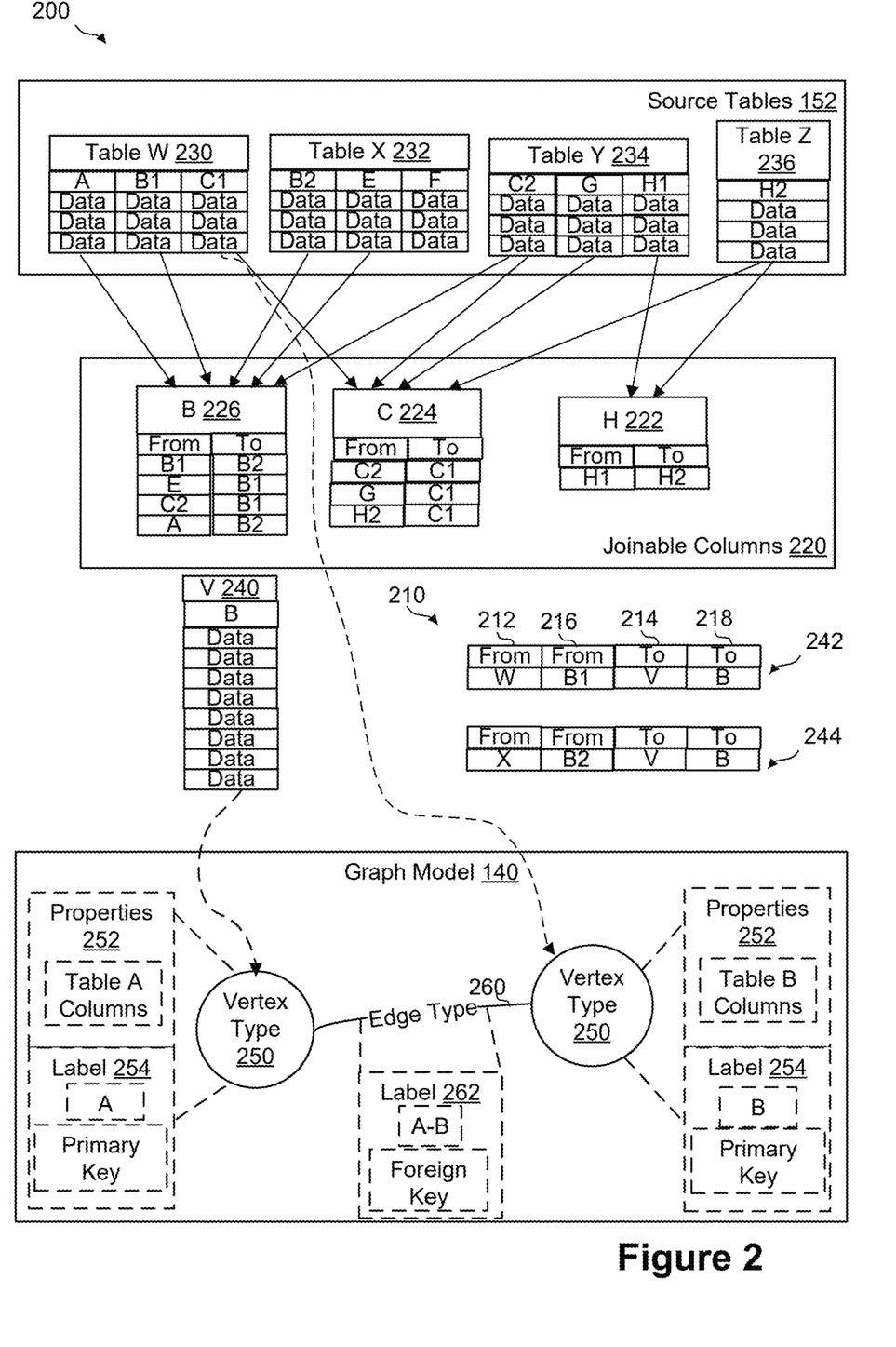
FIG. 2 is a conceptual diagram of a graph model inferred from source tables, in accordance with aspects described herein.

FIG. 2 is a conceptual diagram 200 of a graph model 140 inferred from source tables 152. The source tables 152 may be stored in a data lake 150. In some implementations, the source tables 152 may be from different sources such as different organizations or different departments within one organization. Accordingly, the source tables 152 may not be associated with a pre-existing relational structure such as a relationship schema or semantic model. For illustrative purposes, four tables 230, 232, 234, and 236 are shown. Each table includes columns with a column name and data within each column.

The detection component 132 identifies joinable columns 220 from among the source tables 152. The joinable columns 220 may be based on similarity of the columns as determined by one or more machine-learning models of the detection component 132. An example model that utilizes textual values embedded as high-dimensional vectors and joins columns upon similarity predicates on high-dimensional vectors is described in Y. Dong, K. Takeoka, C. Xiao and M. Oyamada, "Efficient Joinable Table Discovery in Data Lakes: A High-Dimensional Similarity-Based Approach," in 2021 IEEE 37th International Conference on Data Engineering (ICDE), Chania, Greece, 2021 pp. 456-467.

The joinable columns may correspond to a relationship 210 among the columns. A relationship 210 may be represented as pairs of a from-table 212 and from-column 216 to a to-table 214 and to-column 218. For example, the joinable columns 220 may have similarity of column name, column type, or overlapping data. For instance, the detection component 132 may identify a set of joinable columns 222 based on a column H1 in table 234 and a column H2 in table 236. The detection component 132 may also detect a type of relationship or multiplicity as one of 1:1, m:1, or m:m depending on the data in the joinable columns. As another example, the detection component 132 may identify a set of joinable columns 224 based on column C1 in table 230, column C2 in table 234, column G in table 234, and column H2 in table 236. In a third example, the detection component 132 may identify a set of joinable columns 226 based on columns A and B1 in table 230, columns B2 and E in table 232, and column C2 in table 234.

In an aspect, an m:m relationship may present difficulties in representation in a graph model, for example, because an edge cannot connect more than two vertices. The virtual table component 134 may create a virtual table 240 that can break an m:m relationship into two or more m:1 relationships. The virtual table 240 may be a union of corresponding columns. For example, the virtual table 240 may represent an entity B that is described in column B1 of table 230 and column B2 of table 232. Depending on the structure of the underlying source tables 152, the virtual table component 134 may generate the virtual table by selecting or projecting each similar column and performing a union on the selected or projected columns. The relationship represented by the joinable columns 226 may then be broken into relationships 242 and 244, which are each m:1 relationships with the column of the virtual table 240 being the to-column. For example, the relationship 242 may be a m:1 relationship (B1–B) from the B1 column of table 230 to the B column of virtual table 240, and the relationship 244 may be an m:1 relationship (B2-B) from the B2 column of table 232 to the B column of virtual table 240.

In another aspect, a table-column pair can be involved in more than one relationship. For these cases, instead of breaking each relationship into two, the graph model inference tool 130 may detect equivalence classes among the relationships.

In an example scenario, $T_1$, $T_2$, $T_3$, $T_4$, $T_5$, and $T_6$ are datasets on the lake, and the detected m:m relationships are as follows: $r_1(T_1, C_1, T_2, C_2)$, $r_2(T_1, C_1, T_3, C_3)$, $r_3(T_4, C_4, T_2, C_2)$, and $r_4(T_5, C_5, T_6, C_6)$. In this example, the table-column pair $(T_1, C_1)$ appears in both $r_1$ and $r_2$. The fact that $(T_1, C_1)$ and $(T_2, C_2)$ appear in a relationship $r(T_1, C_1, T_2, C_2)$ typically means that they refer to the same entity concept. The graph model inference tool 130 can then define equivalence between the two table-column pairs as $(T_1, C_1)=(T_2, C_2)$. In other words, if $r(T_1, C_1, T_2, C_2)$ then $(T_1, C_1)=(T_2, C_2)$. This equivalence relationship is transitive, i.e. if $(T_1, C_1)=(T_2, C_2)$ and $(T_2, C_2)=(T_3, C_3)$, then $(T_1, C_1)=(T_3, C_3)$. An equivalent class then contains all the equivalent table-column pairs. In the example scenario, the set of relationships produces two equivalent classes: $\{(T_1, C_1), (T_2, C_2), (T_3, C_3), (T_4, C_4)\}$ and $\{(T_5, C_5), (T_6, C_6)\}$. Then for each equivalent class, the graph model inference tool 130 creates a virtual table 240 by unioning all the corresponding columns of the corresponding tables. For $\{(T_1, C_1), (T_2, C_2), (T_3, C_3), (T_4, C_4)\}$, the graph model inference tool 130 creates $T_v$=(select $C_1$ as $C_v$ from $T_1$) union (select $C_2$ as $C_v$ from $T_2$) union (select $C_3$ as $C_v$ from $T_3$) union (select $C_4$ as $C_v$ from $T_4$). The graph model inference tool 130 converts relationships $r_1(T_1, C_1, T_2, C_2)$, $r_2(T_1, C_1, T_3, C_3)$, 13 $(T_4, C_4, T_2, C_2)$ into $r_{b1}(T_1, C_1, T_v, C_v)$, $r_{b2}(T_2, C_2, T_v, C_v)$, $r_{b3}(T_3, C_3, T_v, C_v)$ and $r_{b4}(T_4, C_4, T_v, C_v)$.

The graph model inference tool 130 can use the joinable columns 220 and relationships 242, 244 to generate the graph model 140. For example, the key component 136 can identify primary keys based on a type of the relationships (e.g., 1:1 or m:1). For an m:1 relationship, the to-column 218 can serve as a primary key of the to-table 214. Each from-column 216 of the from-tables 212 is a foreign key to the to-column 218 of the to-table 214. For a 1:1 relationship, the to-column 218 can be a primary key of the to-table 214 and/or the from-column 216 can be a primary key of the from-table 212. The foreign key relationships for a 1:1 relationship are bidirectional.

Once the primary keys are identified, the primary keys can be represented as vertices in the graph model 140. That is, a source table 152 with a primary key can be a vertex type 250 in the graph model 140. The vertex type 250 may be represented as a vertex table, where each row of the vertex table is a vertex in the graph. The primary key serves as a unique id column of the vertex table for the vertex type 250. The vertex type 250 includes a label 254 that indicates the name of the source table 152 having the primary key. The vertex type 250 also includes properties 252 corresponding to the columns of the source table 152 that are not used as keys.

An edge type 260 can be created for each from-table 212 in an m:1 relationship. For 1:1 relationships, either the from-table 212 or the to-table 214 can become an edge type. For instance, if the from-table 212 of a 1:1 relationship is selected as a vertex type, the to-table 214 may be selected as an edge type. In cases where both the from-table 212 and the to-table 214 are selected as vertex types, one of the tables may also be selected as an edge type 260. The edge type 260 may be represented as an edge table, where each row of the edge table is an edge in the graph. The edge types 260 include a label 262 with a combination of the source and destination vertex type names and the foreign key column that relates the tables.

The inference of vertex types and edge types from the relationships 210 can be performed for each relationship 210. The final graph model 140 may include a vertex type 250 corresponding to each source table 152 and an edge type for each from-column 216 in a relationship 210.

Figure 3:
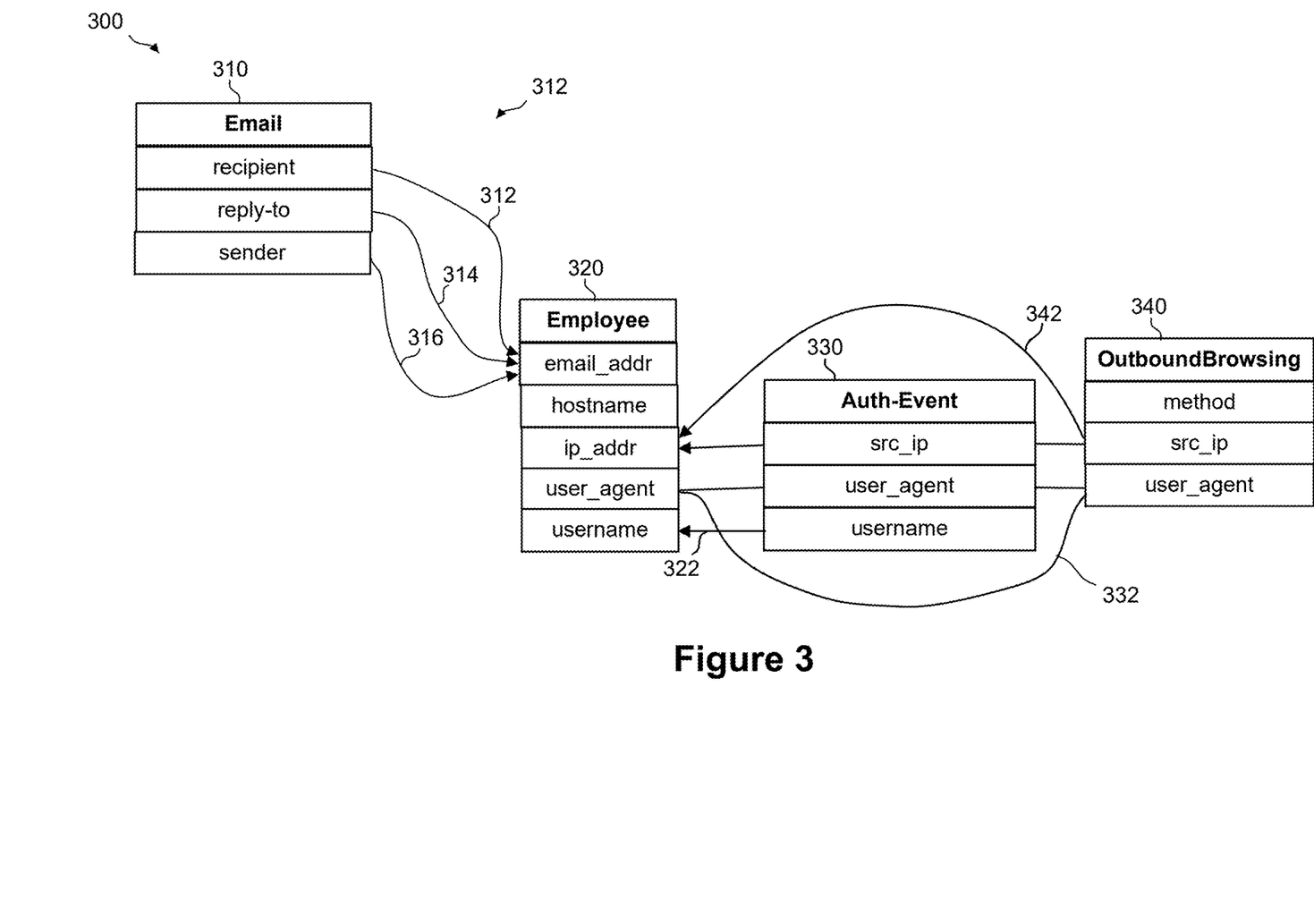
FIG. 3 is a diagram of example relationships among tables as detected based on joinable columns.

FIG. 3 is a diagram of example relationships among tables as detected by the detection component 132. The source tables are represented with bolded table names, and the columns of the tables that are associated with a relationship are indicated below the table names with a line to the related column of another table. Arrows indicate m:1 relationships, whereas lines indicate m:m relationships. For example, the illustrated tables include an email table 310, an employee table 320, an authentication events table 330, and an outbound browsing table 340.

A first example relationship 312 is a m:1 relationship between the recipient column of the email table 310 and the email_addr column of employee table 320. A second example relationship 314 is a m:1 relationship between the reply-to column of the email table 310 and the email_addr column of the employee table 320. A third example relationship 316 is a m:1 relationship between the sender column of the email table 310 and the email_addr column of the employee table 320. Although the columns of the email table 310 have different names, the content (email addresses) are likely to follow a similar format and have overlapping values.

A fourth example relationship 322 is a m:1 relationship between a username column of the employee table 320 and the username column of the authentication events table 330. A fifth example relationship 332 is a m:m relationship between the user_agent column of employee table 320, the user_agent column of the authentication events table 330. There are additional m:m relationships with these columns and the user_agent column of the outbound browsing table 340. In this case, user_agent is likely a separate entity that is referenced by multiple rows of the tables, but does not have an underlying table in the source tables 152. Similarly, a sixth example relationship 342 may be a m:1 relationship between the src_ip column of the outbound browsing table 340 and the ip_addr column of employee table 320. A seventh example relationship 344 is a m:m relationship between the src_ip column of authentication events table 330 and the src_ip column of the outbound browsing table 340. There are additional m:1 and m:m relationships among these columns as illustrated. These three columns may correspond to an IP address entity without a corresponding table in the source tables 152.

FIG. 4 is a diagram of an example graph model 400 corresponding to the example tables and relationships of FIG. 3. The example graph model 400 includes a plurality vertex types that correspond to the source tables in FIG. 3 including an email vertex type 410, an employee vertex type 420, an authentication events vertex type 430, and an outbound browsing vertex type 440. The graph model 400 also includes vertex types for virtual vertex tables created based on detected relationships. For instance, the graph model 400 includes a username_view vertex type 450, a user_agent_view vertex type 460, and a src_ip_view vertex type 470.

Each vertex type includes a name of the vertex type, which may be derived from a name of the corresponding source table or the virtual vertex table. The name of the source table may also be used to label the vertex type. Each vertex type also includes a unique id, which may be the primary key identified for the table.

For example, based on the first example relationship 312 being an m:1 relationship, a row_id column of email table 310 can be identified as a primary key of the email vertex type 410, and the email_addr column of employee table 320 can be identified as the primary key of the employee vertex type 420. Further edge types may be based on the columns of the email table 310 that are the from-columns of the m:1 relationship. For example, for the example relationships 312, 314, and 316, each of the email-recipient edge type 412, email-reply-to edge type 414, and email-sender edge type 416 may be a separate edge labeled with a name that is a combination of the from-column and the from-table, the respective from-column as the source, and the to-column (email_addr) as the destination.

As a second example, based on the fourth example relationship 322 being a m:1 function, there should be a primary key for the username column of the employee table 320. But the to-table (i.e., employee table 320) already has a primary key (email_addr), so a virtual table may be created for the to-column (username). The username column of the virtual table may then be used as a primary key for a username virtual vertex type 450 corresponding to the virtual table. The edge type 432 may be named as a combination of the source vertex type 430 and the foreign-key. Another virtual edge type 422 connects the employee vertex type 420 and the username virtual vertex type 450.

As a third example, the m:m relationship 332 may be broken into two m:1 relationships by adding a virtual table based on the joinable user_agent columns. The virtual table becomes the user_agent_view virtual vertex type 460 with a primary key for the user_agent. An edge type is created for each from-column of the m:1 relationships with the user_agent. For example, an employee-user_agent edge type 424 connects the employee vertex type 420 and the user_agent virtual vertex type 460, an auth-event-username edge type 434 connects the auth-event vertex type 430 to the user_agent virtual vertex type 460, and a browsing-user_agent edge type 442 connects the browsing vertex type 440 to the user_agent virtual vertex type 460.

As a fourth example, the m:m relationship 342 may be broken into two m:1 relationships by adding a virtual table based on the joinable IP address columns. The virtual table becomes the src_ip-view virtual vertex type 470 with a primary key for the src_ip. An edge type is created for each from-column of the m:1 relationships with the src_ip. For example, an employee-src-ip edge type 426 connects the employee vertex type 420 and the src_ip virtual vertex type 470, an auth-event-src_ip edge type 436 connects the auth-event vertex type 430 to the src_ip virtual vertex type 470, and a browsing-src-ip edge type 444 connects the browsing vertex type 440 to the src_ip virtual vertex type 470.

Additionally, the vertex types may include properties based on column names of columns of the corresponding source tables that are not associated with a relationship. For example, the employee vertex type 420 may include a property with a "full_name" column name. Although the full_name column name is not directly related to another table, the graph model 400 allows graph queries and graph algorithms based on the connections of the full_name column name (or data stored therein in source tables) with other vertices. In some implementations, because the edge types are associated with vertex types including such properties, the edge types can include an empty property set to avoid redundancy and only include the labels based on the table names and foreign keys.

FIG. 5 is a schematic diagram of an example of an apparatus 500 (e.g., a computing device) for inferring a graph model from tables in a data lake. The apparatus 500 may be implemented as one or more computing devices in the system 120.

In an example, the apparatus 500 includes at least one processor 502 and a memory 504 configured to execute or store instructions or other parameters related to providing an operating system 506, which can execute one or more applications or processes, such as, but not limited to, a graph model application 508 that implements the graph model system 120. For example, processors 502 and memory 504 may be separate components communicatively coupled by a bus (e.g., on a motherboard or other portion of a computing device, on an integrated circuit, such as a system on a chip (SoC), etc.), components integrated within one another (e.g., a processor 502 can include the memory 504 as an on-board component), and/or the like. Memory 504 may store instructions, parameters, data structures, etc. for use/execution by one or more of the processor 502, individually or in combination, to perform functions described herein. In some implementations, the memory 504 includes storage 552 for use by the graph model application 508. The storage 552 may include the data lake 150 storing the source tables 152.

In an example, the graph model application 508 includes the graph query engine 122, the graph algorithm engine 124, and/or the graph model inference tool 130. The graph model inference tool 130 includes the detection component 132, the virtual table component 134, the key component 136, the vertex component 138, and the edge component 139 discussed above with respect to FIG. 1.

In some implementations, the apparatus 500 is implemented as a distributed processing system, for example, with multiple processors 502 and memories 504 distributed across physical systems such as servers, virtual machines, or datacenters. For example, one or more of the components of the graph model application 508 may be implemented as services executing at different datacenters. The services may communicate via an API.

FIG. 6 is a flow diagram of an example of a method 600 for inferring a graph model from a semantic model that describes source tables and relationships among the source tables. For example, the method 600 can be performed by the graph model inference tool 130, the apparatus 500 and/or one or more components thereof to infer a graph model 140 from a semantic model 160 that describes source tables 152 and relationships 210 among the source tables.

At block 610, the method 600 includes detecting joinable columns within a plurality of columns of source tables in a data lake, the joinable columns defining a plurality of relationships between columns and including columns with an m:m relationship. For example, in an aspect, apparatus 500, processor 502, memory 504, graph model inference tool 130 and/or detection component 132 may be configured to or may comprise means for detecting joinable columns 220 within a plurality of columns of source tables 152 in a data lake 150, the joinable columns defining a plurality of relationships 210 between columns and including columns with an m:m relationship. In some implementations, at sub-block 612, the block 610 may optionally include applying a machine-learning model that identifies similar columns in different ones of the source tables that have similarity of column name, column type, or overlapping data. For example, the detection component 132 may include one or more machine-learning models. In some implementations, at sub-block 614, the block 610 may optionally include generating a virtual table 240 that is a union of the similar columns or a view of the union. In some implementations, at sub-block 616, the block 610 or the sub-block 614 may optionally include selecting or projecting each similar column and performing a union on the selected or projected columns.

At block 620, the method 600 includes extracting, from the joinable columns, a virtual vertex table represented by a union of corresponding columns that breaks an m:m relationship into two m:1 relationships. For example, in an aspect, apparatus 500, processor 502, memory 504, graph model inference tool 130, and/or the virtual table component 134 may be configured to or may comprise means for extracting, from the joinable columns 220, a virtual vertex table 240 represented by a union of corresponding columns that breaks an m:m relationship into two m:1 relationships 242, 244. In some implementations, at sub-block 622, the block 620 may optionally include defining an equivalence class including two or more table-column pairs having one or more common table-column pairs among the plurality of relationships defined by the joinable columns. In some implementations, at sub-block 624, the block 620 may optionally include creating a single virtual vertex table 240 for the table-column pairs in the equivalence class. In some implementations, at sub-block 626, the block 620 may optionally include converting each relationship in the equivalence class to be a relationship between the respective table-column pair and the single virtual vertex.

At block 630, the method 600 includes identifying at least one primary key for each relationship of the plurality of relationships, each relationship defining at least one from-table and one to-table. For example, in an aspect, apparatus 500, processor 502, memory 504, graph model inference tool 130, and/or the key component 136 may be configured to or may comprise means for identifying at least one primary key for each relationship of the plurality of relationships, each relationship defining at least one from-table 212 and one to-table 214. For example, the key component 132 may step through each relationship 210 and identify a from-table 212, to-table 214, from-column 216, and to-column 218. When the relationship 210 is an m:1 relationship, the at least one primary key may include the to-column 218 of the to-table 214 that is referenced by the from-column(s) 216 of the at least one from-table 212. When the relationship 210 is a 1:1 relationship, the at least one primary key may include the to-column 218 of the to-table 214 or the from-column 216 of the from-table 212. For instance, the key identifying component 132 may identify the primary key in a table that is not yet associated with a primary key.

At block 640, the method 600 includes creating a vertex table in the graph model for each source table or virtual vertex table having a primary key, each vertex of the vertex table labeled with a name of a respective source table or a respective virtual vertex table. For example, in an aspect, apparatus 500, processor 502, memory 504, the graph model inference tool 130 and/or the vertex component 138 may be configured to or may comprise means for creating a vertex table (e.g., vertex type 250) in the graph model 140 for each source table 152 or virtual vertex table 240 having a primary key, each vertex of the vertex table labeled with a name of a respective source table or a respective virtual vertex table.

At block 650, the method 600 includes creating an edge table in the graph model for each from-table defined in the plurality of relationships, wherein each edge of the edge table is labeled with a combination of a source vertex table, a destination vertex table, and a foreign-key column name that relates the source vertex table and the destination vertex table. For example, in an aspect, apparatus 500, processor 502, memory 504, the graph model inference tool 130 and/or the edge component 139 may be configured to or may comprise means for creating an edge table (e.g., edge type 260) in the graph model 140 for each from-table 212 defined in the plurality of relationships, wherein each edge of the edge table is labeled with a combination of a source vertex table, a destination vertex table, and a foreign-key column name that relates the source vertex table and the destination vertex table.

At block 670, the method 600 may optionally include executing a graph query or a graph algorithm over an instance graph based on the graph model. For example, in an aspect, apparatus 500, processor 502, memory 504, the graph query engine 122 and/or the graph algorithm engine 124 may be configured to or may comprise means for executing a graph query or a graph algorithm over an instance graph based on the graph model. For example, the instance graph may be constructed as a graph index that references the source tables corresponding to the vertex tables and edge tables using numerical identifiers.

Figure 7:
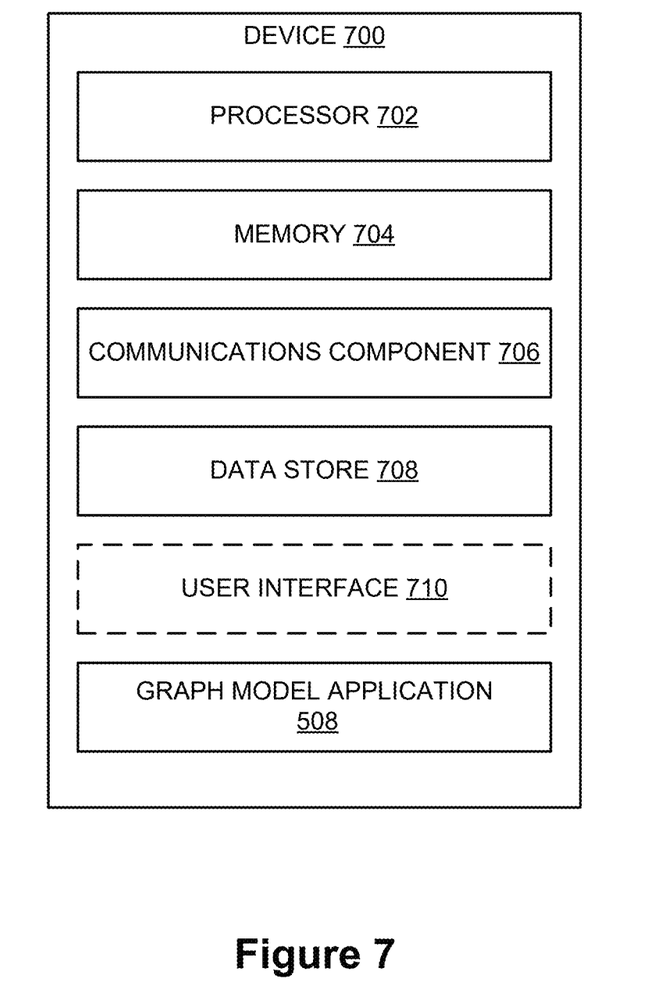
FIG. 7 illustrates an example of a device 700 including additional optional component details as those shown in FIG. 5.

FIG. 7 illustrates an example of a device 700 including additional optional component details as those shown in FIG. 5. In one aspect, device 700 includes processor 702, which may be similar to processor 702 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 further includes memory 704, which may be similar to memory 504 such as for storing local versions of operating systems (or components thereof) and/or applications being executed by processor 702, such as the graph model inference tool 130, key identifying component 132, vertex component 134, edge component 136, etc. Memory 704 can include a type of memory usable by a computer, such as random access memory (RAM), read only memory (ROM), tapes, magnetic discs, optical discs, volatile memory, non-volatile memory, and any combination thereof. The processor 702 may execute instructions stored on the memory 704 to cause the device 700 to perform the methods discussed above with respect to FIG. 6.

Further, device 700 includes a communications component 706 that provides for establishing and maintaining communications with one or more other devices, parties, entities, etc. utilizing hardware, software, and services as described herein. Communications component 706 carries communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc. not currently being executed by processor 702. In addition, data store 708 may be a data repository for the graph model inference tool 130.

Device 700 may optionally include a user interface component 710 operable to receive inputs from a user of device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Device 700 additionally includes the graph model inference tool 130 for inferring a graph model from a semantic model that describes source tables and relationships among the source tables.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The following numbered clauses provide an overview of aspects of the present disclosure:

Clause 1. An apparatus for inferring a graph model from data, comprising: one or more memories; and one or more processors coupled with the memory and, individually or in combination, configured to: detect joinable columns within a plurality of columns of source tables in a data lake, the joinable columns defining a plurality of relationships between columns and including columns with an m:m relationship; extract, from the joinable columns, a virtual vertex table represented by a union of corresponding columns that breaks the m:m relationship into two m:1 relationships; identify at least one primary key for each relationship of the plurality of relationships, each relationship defining at least one from-table and one to-table; create a vertex table in the graph model for each source table or virtual vertex table having a primary key, each vertex of the vertex table labeled with a name of a respective source table or a respective virtual vertex table; create an edge table in the graph model for each from-table defined in the plurality of relationships, wherein each edge of the edge table is labeled with a combination of a source vertex table, a destination vertex table, and a foreign-key column name that relates the source vertex table and the destination vertex table.

Clause 2. The apparatus of clause 1, wherein to detect the joinable columns, the one or more processors, individually or in combination, are configured to apply a machine-learning model that identifies similar columns in different ones of the source tables that have similarity of column name, column type, or overlapping data.

Clause 3. The apparatus of clause 2, wherein to detect the joinable columns, the one or more processors, individually or in combination, are configured to generate a virtual table that is a union of the similar columns or a view of the union.

Clause 4. The apparatus of clause 3, wherein to generate the virtual table, the one or more processors, individually or in combination, are configured to select or project each similar column and perform a union on the selected or projected columns.

Clause 5. The apparatus of any of clauses 1-4, wherein to extract the virtual vertex table, the one or more processors, individually or in combination, are configured to: define an equivalence class including two or more table-column pairs having one or more common table-column pairs among the plurality of relationships defined by the joinable columns; and create a single virtual vertex table for the table-column pairs in the equivalence class.

Clause 6. The apparatus of clause 5, wherein to extract the virtual vertex table, the one or more processors, individually or in combination, are configured to convert each relationship in the equivalence class to be a relationship between the respective table-column pair and the single virtual vertex table.

Clause 7. The apparatus of any of clauses 1-6, the one or more processors, individually or in combination, are configured to identify the at least one primary key based on whether the relationship is a m:1 relationship or a 1:1 relationship.

Clause 8. The apparatus of clause 7, wherein the at least one primary key includes a to-column of the to-table for an m:1 relationship.

Clause 9. The apparatus of clause 7, wherein the at least one primary key includes a to-column of the to-table and a from-column of the from-table for a 1:1 relationship.

Clause 10. A method of inferring a graph model from data, comprising: detecting joinable columns within a plurality of columns of source tables in a data lake, the joinable columns defining a plurality of relationships between columns and including columns with an m:m relationship; extracting, from the joinable columns, a virtual vertex table represented by a union of corresponding columns that breaks the m:m relationship into two m:1 relationships; identifying at least one primary key for each relationship of the plurality of relationships, each relationship defining at least one from-table and one to-table; creating a vertex table in the graph model for each source table or virtual vertex table having a primary key, each vertex of the vertex table labeled with a name of a respective source table or a respective virtual vertex table; creating an edge table in the graph model for each from-table defined in the plurality of relationships, wherein each edge of the edge table is labeled with a combination of a source vertex table, a destination vertex table, and a foreign-key column name that relates the source vertex table and the destination vertex table.

Clause 11. The method of clause 10, wherein detecting the joinable columns comprises applying a machine-learning model that identifies similar columns in different ones of the source tables that have similarity of column name, column type, or overlapping data.

Clause 12. The method of clause 11, wherein detecting the joinable columns comprises generating a virtual table that is a union of the similar columns or a view of the union.

Clause 13. The method of clause 12, wherein generating the virtual table comprises selecting or projecting each similar column and performing a union on the selected or projected columns.

Clause 14. The method of any of clauses 10-13, wherein extracting the virtual vertex table comprises: defining an equivalence class including two or more table-column pairs having one or more common table-column pairs among the plurality of relationships defined by the joinable columns; and creating a single virtual vertex table for the table-column pairs in the equivalence class.

Clause 15. The method of clause 14, wherein extracting the virtual vertex table comprises converting each relationship in the equivalence class to be a relationship between the respective table-column pair and the single virtual vertex table.

Clause 16. The method of any of clauses 10-15, wherein identifying the at least one primary key is based on whether the relationship is a m:1 relationship or a 1:1 relationship.

Clause 17. The method of clause 16, wherein the at least one primary key includes a to-column of the to-table for an m:1 relationship.

Clause 18. The method of clause 16, wherein the at least one primary key includes a to-column of the to-table and a from-column of the from-table for a 1:1 relationship.

Clause 19. A non-transitory computer-readable medium having computer-executable instructions stored thereon for inferring a graph model from data, the instructions when executed by a computer processor cause the computer processor to: detect joinable columns within a plurality of columns of source tables in a data lake, the joinable columns defining a plurality of relationships between columns and including columns with an m:m relationship; extract, from the joinable columns, a virtual vertex table represented by a union of corresponding columns that breaks the m:m relationship into two m:1 relationships; identify at least one primary key for each relationship of the plurality of relationships, each relationship defining at least one from-table and one to-table; create a vertex table in the graph model for each source table or virtual vertex table having a primary key, each vertex of the vertex table labeled with a name of a respective source table or a respective virtual vertex table; create an edge table in the graph model for each from-table defined in the plurality of relationships, wherein each edge of the edge table is labeled with a combination of a source vertex table, a destination vertex table, and a foreign-key column name that relates the source vertex table and the destination vertex table.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for inferring a graph model from data, comprising:
    one or more memories; and
    one or more processors coupled with the memory and, individually or in combination, configured to:
        detect joinable columns within a plurality of columns of source tables in a data lake, the joinable columns defining a plurality of relationships between columns and including columns with an m:m relationship,
            wherein to detect the joinable columns, the one or more processors, individually or in combination, are configured to apply a machine-learning model that identifies similar columns in different ones of the source tables that have similarity of column name, column type, or overlapping data;
        extract, from the joinable columns, a virtual vertex table represented by a union of corresponding columns that breaks the m:m relationship into two m:1 relationships;
        identify at least one primary key for each relationship of the plurality of relationships, each relationship defining at least one from-table and one to-table;
        create a vertex table in the graph model for each source table or virtual vertex table having a primary key, each vertex of the vertex table labeled with a name of a respective source table or a respective virtual vertex table;
        create an edge table in the graph model for each from-table defined in the plurality of relationships, wherein each edge of the edge table is labeled with a combination of a source vertex table, a destination vertex table, and a foreign-key column name that relates the source vertex table and the destination vertex table.

2. The apparatus of claim 1, wherein the plurality of columns of source tables in the data lake remain in the data lake and the vertex tables and edge tables of the graph model reference the plurality of columns of source tables in the data lake, wherein the one or more processors, individually or in combination are further configured to execute a graph algorithm to answer questions regarding the data in the data lake.

3. The apparatus of claim 1, wherein to detect the joinable columns, the one or more processors, individually or in combination, are configured to generate a virtual table that is a union of the similar columns or a view of the union.

4. The apparatus of claim 3, wherein to generate the virtual table, the one or more processors, individually or in combination, are configured to select or project each similar column and perform a union on the selected or projected columns.

5. The apparatus of claim 1, wherein to extract the virtual vertex table, the one or more processors, individually or in combination, are configured to:
    define an equivalence class including two or more table-column pairs having one or more common table-column pairs among the plurality of relationships defined by the joinable columns; and
    create a single virtual vertex table for the table-column pairs in the equivalence class.

6. The apparatus of claim 5, wherein to extract the virtual vertex table, the one or more processors, individually or in combination, are configured to convert each relationship in the equivalence class to be a relationship between the respective table-column pair and the single virtual vertex table.

7. The apparatus of claim 1, the one or more processors, individually or in combination, are configured to identify the at least one primary key based on whether the relationship is a m:1 relationship or a 1:1 relationship.

8. The apparatus of claim 7, wherein the at least one primary key includes a to-column of the to-table for an m:1 relationship.

9. The apparatus of claim 7, wherein the at least one primary key includes a to-column of the to-table and a from-column of the from-table for a 1:1 relationship.

10. A method of inferring a graph model from data, comprising:
    detecting joinable columns within a plurality of columns of source tables in a data lake, the joinable columns defining a plurality of relationships between columns and including columns with an m:m relationship, wherein detecting the joinable columns comprises applying a machine-learning model that identifies similar columns in different ones of the source tables that have similarity of column name, column type, or overlapping data;
    extracting, from the joinable columns, a virtual vertex table represented by a union of corresponding columns that breaks the m:m relationship into two m:1 relationships;
    identifying at least one primary key for each relationship of the plurality of relationships, each relationship defining at least one from-table and one to-table;
    creating a vertex table in the graph model for each source table or virtual vertex table having a primary key, each vertex of the vertex table labeled with a name of a respective source table or a respective virtual vertex table;
    creating an edge table in the graph model for each from-table defined in the plurality of relationships, wherein each edge of the edge table is labeled with a combination of a source vertex table, a destination vertex table, and a foreign-key column name that relates the source vertex table and the destination vertex table.

11. The method of claim 10, wherein the plurality of columns of source tables in the data lake remain in the data lake and the vertex tables and edge tables of the graph model reference the plurality of columns of source tables in the data lake, wherein the method further comprises executing a graph algorithm to answer questions regarding the data in the data lake.

12. The method of claim 10, wherein detecting the joinable columns comprises generating a virtual table that is a union of the similar columns or a view of the union.

13. The method of claim 12, wherein generating the virtual table comprises selecting or projecting each similar column and performing a union on the selected or projected columns.

14. The method of claim 10, wherein extracting the virtual vertex table comprises:
    defining an equivalence class including two or more table-column pairs having one or more common table-column pairs among the plurality of relationships defined by the joinable columns; and
    creating a single virtual vertex table for the table-column pairs in the equivalence class.

15. The method of claim 14, wherein extracting the virtual vertex table comprises converting each relationship in the equivalence class to be a relationship between the respective table-column pair and the single virtual vertex table.

16. The method of claim 10, wherein identifying the at least one primary key is based on whether the relationship is a m:1 relationship or a 1:1 relationship.

17. The method of claim 16, wherein the at least one primary key includes a to-column of the to-table for an m:1 relationship.

18. The method of claim 16, wherein the at least one primary key includes a to-column of the to-table and a from-column of the from-table for a 1:1 relationship.

19. A non-transitory computer-readable medium having computer-executable instructions stored thereon for inferring a graph model from data, the instructions when executed by a computer processor cause the computer processor to:
    detect joinable columns within a plurality of columns of source tables in a data lake, the joinable columns defining a plurality of relationships between columns and including columns with an m:m relationship, wherein the instructions to detect the joinable columns, comprise instructions to apply a machine-learning model that identifies similar columns in different ones of the source tables that have similarity of column name, column type, or overlapping data;
    extract, from the joinable columns, a virtual vertex table represented by a union of corresponding columns that breaks the m:m relationship into two m:1 relationships;
    identify at least one primary key for each relationship of the plurality of relationships, each relationship defining at least one from-table and one to-table;
    create a vertex table in the graph model for each source table or virtual vertex table having a primary key, each vertex of the vertex table labeled with a name of a respective source table or a respective virtual vertex table;
    create an edge table in the graph model for each from-table defined in the plurality of relationships, wherein each edge of the edge table is labeled with a combination of a source vertex table, a destination vertex table, and a foreign-key column name that relates the source vertex table and the destination vertex table.

20. The non-transitory computer-readable medium of claim 19, wherein the plurality of columns of source tables in the data lake remain in the data lake and the vertex tables and edge tables of the graph model reference the plurality of columns of source tables in the data lake, wherein the instructions further comprise instructions to execute a graph algorithm to answer questions regarding the data in the data lake.

* * * * *